US007136593B1

(12) United States Patent
Yano

(10) Patent No.: US 7,136,593 B1
(45) Date of Patent: Nov. 14, 2006

(54) WAVELENGTH-DIVISION MULTIPLEXED OPTICAL TRANSMISSION SYSTEM

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 949 days.

(21) Appl. No.: 09/593,761

(22) Filed: Jun. 14, 2000

(30) Foreign Application Priority Data

Jun. 16, 1999 (JP) .................................. 11-169078

(51) Int. Cl.
H04B 10/00 (2006.01)
(52) U.S. Cl. .................... 398/158; 398/79; 398/140; 398/141; 398/161; 398/102; 398/182; 398/183; 398/188; 398/192; 398/193; 398/202; 398/91; 398/47; 398/154; 398/31; 398/33
(58) Field of Classification Search ................ 398/79, 398/31, 33, 34, 182, 140, 141, 91, 202, 188, 398/183, 192, 193, 154, 47, 53, 102, 161, 398/158, 159
See application file for complete search history.

(56) References Cited

U.S. PATENT DOCUMENTS

| 4,267,590 | A | * | 5/1981 | Bosotti ........................ 398/91 |
| 5,453,865 | A | * | 9/1995 | Faulkner et al. ............. 359/110 |
| 5,572,350 | A | * | 11/1996 | Spanke ........................ 398/54 |
| 5,636,045 | A | * | 6/1997 | Okayama et al. ............. 398/52 |
| 5,706,346 | A | * | 1/1998 | Katta et al. .................. 380/217 |
| 5,737,106 | A | * | 4/1998 | Sansonetti et al. ........... 398/102 |
| 5,739,934 | A | * | 4/1998 | Nomura et al. .............. 359/124 |
| 6,075,628 | A | * | 6/2000 | Fisher et al. ................. 359/110 |
| 6,215,567 | B1 | * | 4/2001 | Tochio ........................ 359/125 |
| 6,366,377 | B1 | * | 4/2002 | Tajima ....................... 359/128 |
| 6,441,935 | B1 | * | 8/2002 | Araki et al. ................. 359/139 |
| 6,619,867 | B1 | * | 9/2003 | Asahi ......................... 398/154 |
| 6,654,562 | B1 | * | 11/2003 | Murata ....................... 398/79 |

FOREIGN PATENT DOCUMENTS

| EP | 0543327 A1 | * | 5/1993 |
| JP | 4-162852 | | 6/1992 |
| JP | 7-66779 | | 3/1995 |
| JP | 9-149006 | | 6/1997 |
| JP | 9-270769 | | 10/1997 |
| JP | 10-308703 | | 11/1998 |
| JP | 2000-349706 | | 12/2000 |

* cited by examiner

*Primary Examiner*—Hanh Phan
(74) *Attorney, Agent, or Firm*—Young & Thompson

(57) ABSTRACT

A wavelength-division multiplexed optical transmission system to keep the correlation of data patterns among wavelength channels to the low level, preventing large XPM and XGM from occurring when the correlation is strong, and assuring a stable transmitting quality. The wavelength-division multiplexed optical transmission system for transmitting an optical signal constructed by a frame has any of (1) a frame phase changing circuit for mutually differing transmitting frame phases between at least two or more wavelength channels among a wavelength channel group transmitted through the same optical fiber transmitting line system, or (2) a scrambling circuit using a data scrambler based on a pseudo random pattern for mutually differing scrambling patterns between two or more wavelength channels among a wavelength channel group transmitted through the same optical fiber transmitting line, or (3) a dummy data generating circuit for mutually differing invalid data patterns between at least two or more wavelength channels in a wavelength channel group transmitted through the same optical fiber transmitting line when transmitting meaningless data.

3 Claims, 16 Drawing Sheets

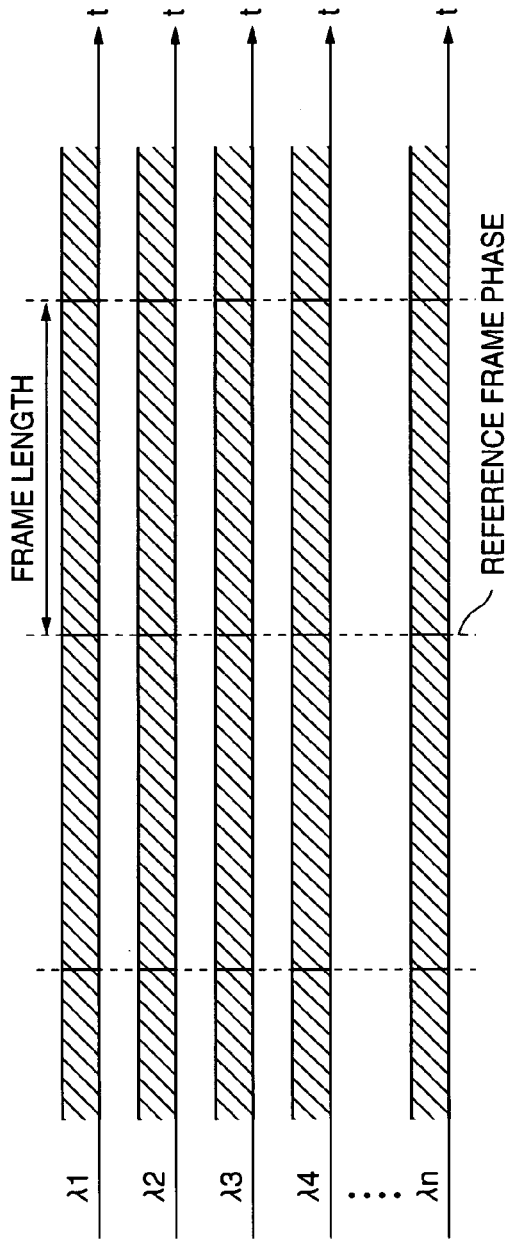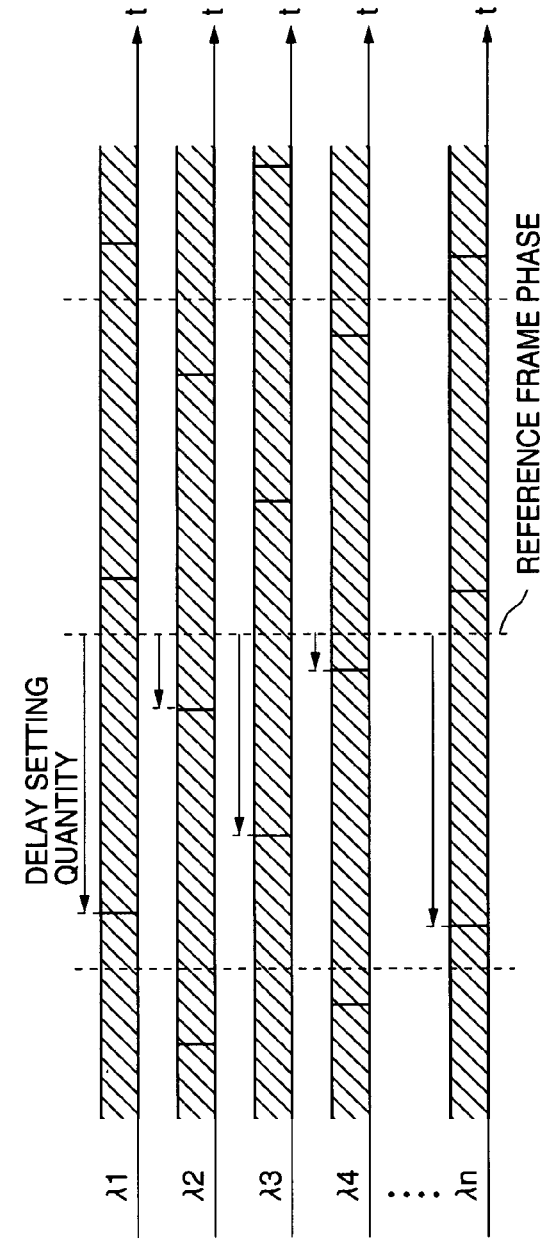
Fig.3A
Fig.3B

| | SEQUENCE A | SEQUENCE B |
|---|---|---|
| 1 | 7、1 | 7、6 |
| 2 | 7、3 | 7、4 |
| 3 | 7、3、2、1 | 7、6、5、4 |
| 4 | 7、4、3、2 | 7、5、4、3 |
| 5 | 7、6、4、2 | 7、5、3、1 |
| 6 | 7、6、3、1 | 7、6、4、1 |
| 7 | 7、6、5、2、 | 7、5、2、1 |
| 8 | 7、6、5、4、2 | 7、6、5、3、2、1 |
| 9 | 7、5、4、3、2、1 | 7、6、5、4、3、2 |

WAVELENGTH-DIVISION MULTIPLEXED OPTICAL TRANSMISSION SYSTEM

BACKGROUND OF THE INVENTION

1. Field of the Invention

The present invention relates to a wavelength-division multiplexed optical transmission system, more particularly, to a wavelength-division multiplexed optical transmission system which is capable of reducing inter-channel correlation that may cause a serious transmission quality degradation.

2. Description of the Related Art

In these days, according to digital standardized information communication used for an optical fiber transmission system, there is widely utilized a frame synchronous communication system which is called an SONET (Synchronous Optical Network)/SDH (Synchronous Digital Hierarchy)

According to the SONET/SDH standard, relative phase difference information between a data signal and a frame phase, what is called a pointer, is given to an overhead area in a frame and transmitted, thereby enabling the change in phase difference between the data signal and the frame phase.

Since signals transmitted from a plurality of different stations incur transmitting delay and jitter/wander, the frame phases are made various. Then, a receiving station exchanges a pointer so as to match the transmitted frame phases with a frame phase of the station reference. The all of frame phases based on the SONET/SDH standard are as same as the frame phase based on the station reference after the pointer exchanging process and therefore signal processes such as exchange can be executed easily.

According to the SONET/SDH standard, a scrambling/descrambling method for suppressing the sequence of the same symbol (such as 0,0,0,0 . . . or 1,1,1,1 . . . ) is also defined. Specifically speaking, it is defined to use a binary NRZ (Non-Return to Zero) format which is scrambled and to set to be equal to $(1+X^6+X^7)$, a polynomial for generating a pseudo random (PRBS: Pseudo Random Bit Sequence) pattern which is used for scrambling. FIGS. 12 and 13 show a functional block of scrambling/descrambling and a constructional example of a PRBS pattern generator.

That is, referring to FIG. 12, based on the PRBS pattern which is generated by a PRBS pattern generator 131a, input data is scrambled by a gate circuit 131b on a transmitter 131 side, and the scrambled data is transmitted to a receiver 231 side via a transmitting line 500. Based upon the PRBS pattern generated by a PRBS pattern generator 231a, data scrambled by the gate circuit 231b is descrambled on a receiver 231 side.

Referring to FIG. 13, the PRBS pattern generator 131a comprises flip-flops 41 to 47 and a gate circuit 48, and generates the PRBS pattern on the basis of a bit rate clock and a frame pulse which are inputted and transmits the generated PRBS pattern to the gate circuit 131b.

Incidentally, according to a recent optical transmission system, the introduction of a so-called wavelength multiplex/demultiplex technique is started, whereby a plurality of channels having different wavelengths are transmitted in a single optical fiber, so as to respond to the increase in transmitting capacity demand.

As for one merit of the wavelength multiplexing method, it is exemplified to handle wavelength channels as if they were transmitted in an individual fiber. Therefore, the wavelength multiplexing technique is introduced and the capacity is increased, without drastically changing the SONET/SDH standard which took no account of the wavelength multiplex. As a result, generally, a plurality of SONET/SDH channels are simultaneously transmitted in a single optical fiber as an operating form in these days.

However, a problem might arise, when wavelength-multiplexing the SONET/SDH signal which took no account of the wavelength multiplexing transmission as it is. In particular, according to a conventional SONET/SDH system, there is a problem to have no guarantee on no correlativity for data among a plurality of wavelength channels which are transmitted in parallel in the optical transmitting line. In the case where the data among the parallel transmitted channels is strongly correlative, it is dangerous to cause the serious deterioration in transmission. This dangerous point will be described hereinlater.

It is known to degrade a signal waveform due to a non-linear phase modulating effect which is caused in the optical fiber upon transmitting the data in the optical fiber. According to the non-linear phase modulating effect, the refractive index of optical fiber is varied by depending on optical intensity, thereby phase modulating the optical signal which is propagated in the optical fiber. The phase modulating component is converted into an intensity modulating component by GVD (Group Velocity Dispersion: chromatic dispersion) in the optical fiber, and to thereby become a waveform distortion.

It is considered that there are a non-linear phase modulation caused by intensity change of a noticed channel itself (SPM: Self Phase Modulation) and a non-linear phase modulation caused by intensity change of a channel travelling in parallel (XPM: Cross Phase Modulation), respectively. Particularly, the XPM is phase modulation caused by a signal having no correlation with information which the XPM itself has, and thus the transmitting characteristic is deteriorated certainly.

The next description turns to a case of causing an abnormally large XPM. FIG. 11 is a schematic diagram of a typical wavelength-division multiplexed optical transmission system. Referring to FIG. 11, a wavelength-division multiplexed optical transmission system comprises: a transmitting side including bit error rate measuring equipment 101, terminals 111 to 126, optical transmitters 131 to 146, and a multiplexer 150; and a receiving side including bit error rate measuring equipment 201, terminals 211 to 226, optical receivers 231 to 246, and a optical demultiplexer 250. Note that the optical transmitting line, which connects the transmitting side to the receiving side and comprises optical amplifiers 301 and 302 and optical fibers 401 and 402.

If normally operating the wavelength-division multiplexed optical transmission system, as shown in FIG. 14, data through which wavelength channels transmit has no correlation each other and data is never correlative. However, if all of the channels except for any noticed channel (referred to as λ3, herein) have the same data and same phase, as shown in FIG. 15, an abnormally large XPM occurs in the noticed channel. Although such a situation should be prevented as much as possible, there is a great of risk for the conventional apparatus to get into such a situation.

First, the frame phase matching is caused by matching the frame phase with the reference frame phase which is distributed from the station in a flow of the signal process. The data matching hardly occurs upon normal operation and, however, there is a possibility that the data matching is caused exceptionally, such as alarm transferring case.

A transmitter in the SONET/SDH system is defined to input dummy data into a data payload portion and continue to transmit the dummy data, even if no data to be communicated is inputted. This is the reason to continue to communicate the clock signal and communicate information in the overhead portion, which is stored into a portion other than the data payload.

There is a specific case of alarm transfer what is called an AIS-L based on the SONET/SDH standard. In this case, it is defined that the whole data payload portion is full of "1", scrambled normally, and transmitted. The data included in the data payload portion becomes a scrambling pattern itself. Consequently, transmitting patterns among the channels are the same and the correlativity is extremely strong.

As another problem which arises by making the frame phase similar, there is a cross gain modulation effect (XGM: Cross Gain Modulation) in an optical amplifier in these days. There is typically used a laser amplifier using an optical fiber, to which an active element (rare earth element such as erbium) is doped, as an optical amplifier. Since the amplifier amplifies a wave so as to collect light which has been wavelength-multiplexed as single light, the intensity change in any desired channel can be transferred to the intensity fluctuation of another channel. That is called a cross gain modulation effect (XGM) and has a close relation to a relaxation oscillation frequency in the laser amplifying system.

The transfer function has a low pass filter characteristic and the relaxation oscillation frequency is a cut-off frequency of low-pass filter. Specifically speaking, the relaxation oscillation frequency is equal to 1 to 3 kHz, in case of using a Erbium-doped fiber amplifier (EDFA).

Corresponding thereto, there is a problem how low frequency component is included in the transmitted signal. The frame frequency period of the SONET/SDH signal is equal to 8 kHz, so that the 8 kHz-frequency component must be transmitted without a problem. Although this value is finely over a value of the cut-off frequency, it is understood that there is no allowance for transmission.

If the frame phases among the channels are ununiform upon amplifying the wavelength-multiplexed light, it can be expected that the frame frequency components are made uniform and are not proportional to the number of channels, when seeing the ununiform frame phases as a whole. On the contrary, if the frame phases are made uniform, it is remarkably dangerous to transfer the intensity fluctuation to a channel of a channel except for the noticed channel.

Actually, if making a channel excluding the noticed channel have the same data and the same frame phase in an examining system as shown in FIG. 11, a serious bit error rate degradation is observed in the noticed channel.

SUMMARY OF THE INVENTION

To solve the above-expressed problems, it is an object of the present invention to provide a wavelength-division multiplexed optical transmission system capable of keeping the correlation of data patterns among wavelength channels to the low level, preventing large XPM and XGM from occurring when the correlation is strong, and assuring a stable transmitting quality.

According to the present invention, there is provided a wavelength-division multiplexed optical transmission system for transmitting an optical signal consisting of a frame via an optical fiber transmitting line, comprising a unit for mutually differing transmitting frame phases between at least two or more wavelength channels among a wavelength channel group which is transmitted through the same optical fiber transmitting line.

According to the present invention, there is provided another wavelength-division multiplexed optical transmission system using a data scrambler based on a pseudo random pattern, comprising a unit for mutually differing scrambling patterns between at least two or more wavelength channels among a wavelength channel group which is transmitted through the same optical fiber transmitting line.

According to the present invention, there is provided further another wavelength-division multiplexed optical transmission system for transmitting an optical signal via an optical fiber transmitting line, comprising a unit for mutually differing invalid data patterns between at least two or more wavelength channels among a wavelength channel group which is transmitted through the same optical fiber when transmitting meaningless data.

In other words, the wavelength-division multiplexed optical transmission system of the present invention has a system for mutually differing the frame phases among the wavelength channels upon multiplexing the wavelength.

The wavelength-division multiplexed optical transmission system of the present invention also has a system for making it possible to select a pseudo random pattern used for scrambling from among a plurality of kinds of the pseudo random pattern, and for mutually differing data patterns transmitted upon inputting no transmitting data among wavelength channels.

Further, the wavelength-division multiplexed optical transmission system of the present invention has a system for storing different dummy patterns among the wavelength channels into a data payload portion, upon transmitting dummy data for some reason.

Accordingly, according to the wavelength-division multiplexed optical transmission system of the present invention, it is possible to decrease the correlativity among the channels whose wavelengths are multiplexed and suppress the occurrence of abnormally large XPM and XGM.

BRIEF DESCRIPTION OF THE DRAWINGS

The above and other objects, features and advantages of the present invention will become more apparent from the following detailed description when taken in conjunction with the accompanying drawings wherein:

FIG. 3 A is a timing chart showing a state in which frame phases are the same;

FIG. 3 B is a timing chart showing a state in which frame phases are different each other;

DETAILED DESCRIPTION OF THE PREFERRED EMBODIMENTS

Figure 1:
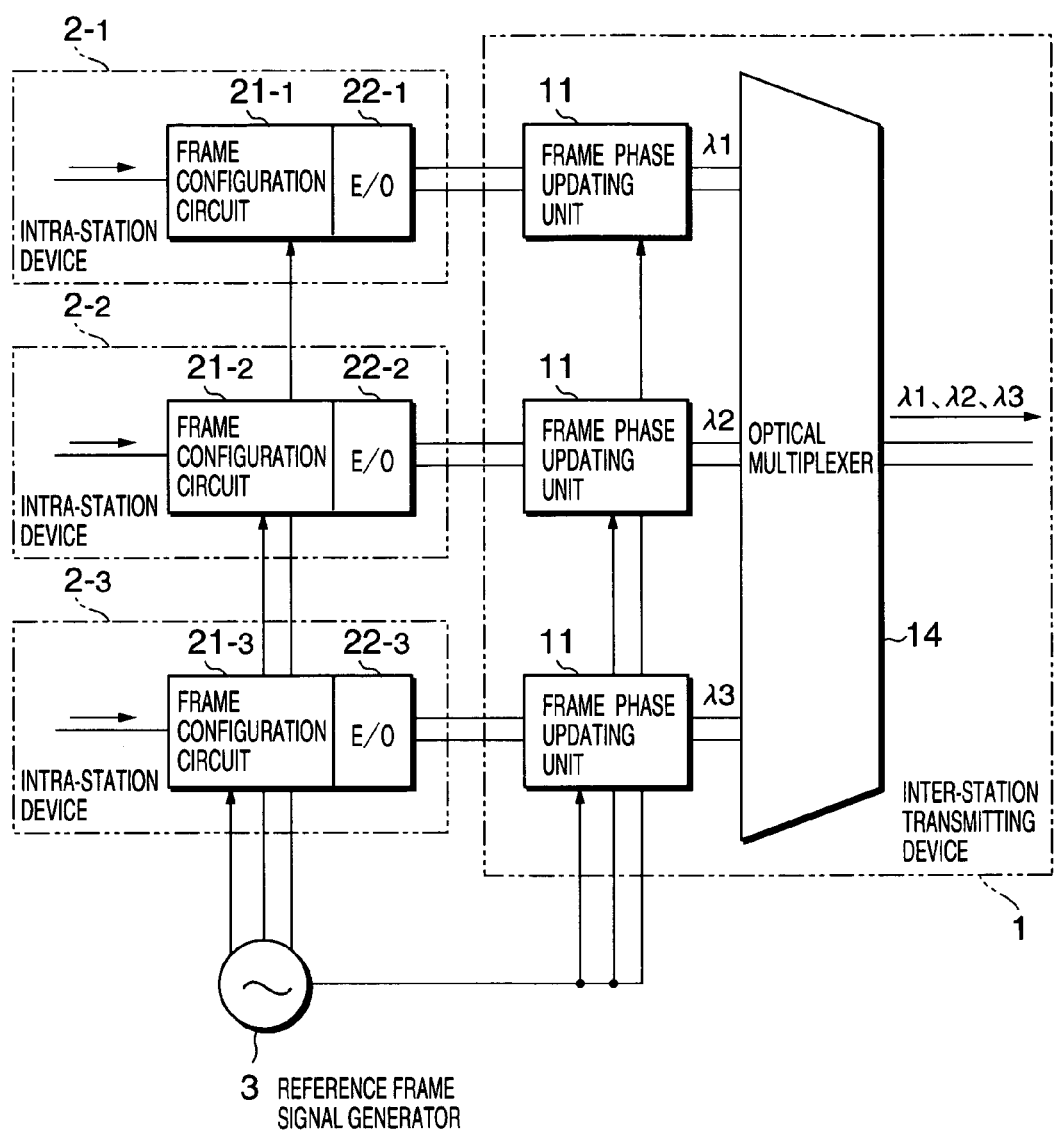
FIG. 1 is a block diagram showing a construction on a transmitting side in a wavelength-division multiplexed optical transmission system according to a first embodiment of the present invention.

The next description turns to embodiments of the present invention with reference to the drawings. FIG. 1 is a block diagram showing a construction on a transmission side in a wavelength-division multiplexed optical transmission system according to a first embodiment of the present invention, and corresponds to the construction on a transmitting side in an optical transmission system including a transmitter Tx100 and a receiver Rx200, which is connected via an optical transmitting line 300 made up of an optical fiber shown in FIG. 17.

Referring to FIG. 1, the transmitting side in the wavelength-division multiplexed optical transmission system according to the first embodiment of the present invention comprises an inter-station transmitting device 1 and intra-station devices 2-1 to 2-3. It is noted to schematically indicate a portion wherein optical signals outputted from the intra-station devices 2-1 to 2-3 are wavelength-multiplexed and transmitted to an optical fiber transmitting line (not shown) connecting among stations by only three channels (having three wavelengths and wavelength channels $\lambda 1$ to $\lambda 3$) in FIG. 1.

The inter-station transmitting device 1 comprises frame phase updating units 11 to 13 and an optical multiplexer 14. The intra-station devices 2-1 to 2-3 comprise frame configuration circuits 21-1 to 21-3 and E/Os (electric/optical signal converting circuits) 22-1 to 22-3, respectively.

The frame configuration circuits 21-1 to 21-3 store data in the intra-station devices 2-1 to 2-3 into frames and output the stored data. The E/Os 22-1 to 22-3 convert the frames from the frame configuration circuits 21-1 to 21-3 into optical signals and output the optical signals to the inter-station transmitting device 1.

Based on a reference frame signal generated by a reference frame signal generator 3, the frame phase updating units 11 to 13 in the inter-station transmitting device 1 update transmitting frame phases of wavelength channels of the optical signals from the intra-station devices 2-1 to 2-3 so as to differ the transmitting frame phases each other. In this case, the frame phase updating units 11 to 13 update frame phases so that reference frame phases are delayed by preset time and the delayed phases become transmitting frame phases for themselves, respectively.

The optical multiplexer 14 multiplexes the optical signals obtained by updating the transmitting frame phases by the frame phase updating units 11 to 13, and transmits the multiplexed optical signals to the optical fiber transmitting line.

Figure 2:
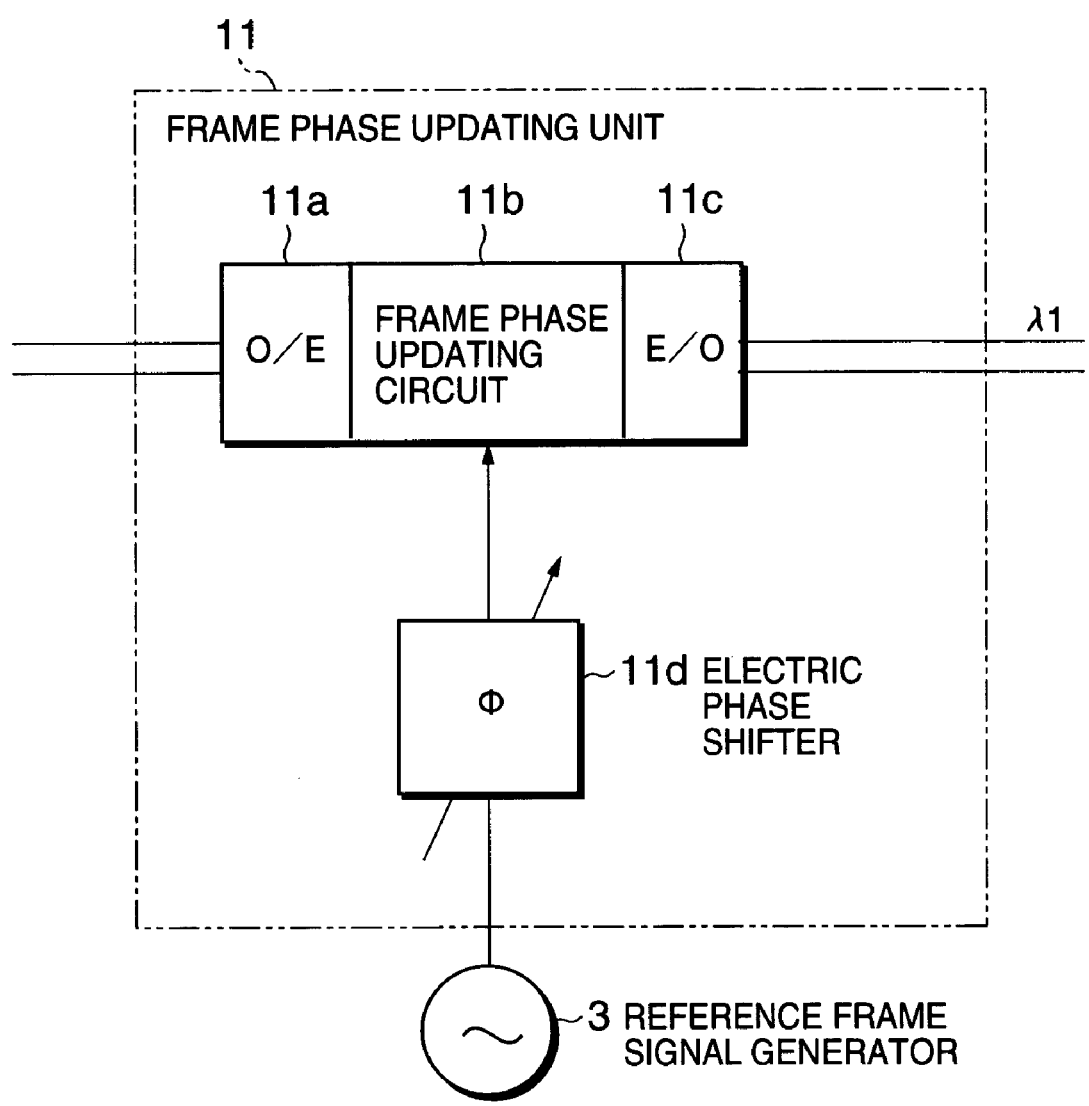
FIG. 2 is a block diagram showing a constructional diagram of a frame phase updating circuit in FIG. 1.

FIG. 2 is a block diagram showing a constructional example of the frame phase updating unit 11 in FIG. 1. Referring to FIG. 2, the frame phase updating unit 11 comprises: an O/E (optical/electric signal converting circuit) 11a; a frame phase updating circuit 11b; an E/O 11c; and an electric phase shifter 11d.

The O/E 11a converts an optical signal from intra-station device into an electric signal. The frame phase updating circuit 11b configures a frame, based on the electric signal which has been converted by the O/E 11a. The E/O 11c converts the frame from the frame phase updating circuit 11b into an optical signal.

An E/O or O/E, what is called an intra-station interface, is generally used for communication between the intra-station devices, as one example. The E/O or O/E is more inexpensive and simple than an inter-station interface for long-distance transmission between remote stations. The difference between the intra-station interface and the inter-station interface is distinct in point of those wavelengths. Mainly, the intra-station interface utilizes a band of 1.3 μm and the inter-station interface utilizes 1.55 μm. The wavelength multiplexing technique is mainly utilized for the inter-station interface, thereby managing the wavelengths of channels precisely.

For the purpose to limit the use of an expensive inter-station interface to a necessary and minimum level, according to a typical used method, an O/E/O is disposed between the intra-station device and the inter-station transmitting device. According to a conventional O/E/0, although a signal is not processed, an optical wavelength and a signal quality are converted into those proper to the long distance wavelength multiplexing transmission.

When changing the transmitting frame phase, the frame phase updating units 11 to 13 may execute only a pointer process. Therefore, the delay in data due to the pointer process can be suppressed to the minimum. In proportional to the limitation for the function, it is also able to make a signal processing circuit simple and to reduce costs. When configurating a frame for an error correcting code here, the first embodiment of the present invention can be embodied by the addition of a code error correcting circuit to the processing circuit, thereby suppressing the increase in the number of parts.

According to a method shown in FIG. 2, a reference frame signal transmitted from the reference frame signal generator 3 is phase-shifted by a desired quantity by use of the electric phase shifter 11d, and the phase-shifted signal is set to a frame phase for itself. As the electric phase shifter 11d, a variable timer and a variable delay line can be employed.

As the electric phase shifter 11d, a form implemented by the variable timer is embodied simple and inexpensively. The target, to which the first embodiment of the present invention is applied, is not regulated to the SONET/SDH signal, so that the first embodiment also can be embodied by the variable delay line if a frame period is short.

Then, the construction of the other frame phase updating units 12 and 13 in the inter-station transmitting device 1 is as same as that of the frame phase updating unit 11. The frame phase updating units 12 and 13 operate, similarly to the frame phase updating unit 11. However, the frame phase updating units 11 to 13 are preset so as to differ the delay quantities by the electric phase shifter 11d, respectively.

FIG. 3 A is a timing chart showing a state in which the frame phases are the same, and FIG. 3 B is a timing chart showing a state in which the frame phases are different.

Referring to FIGS. 3 A and 3B, the next description turns to a method of avoiding matching the frame phases in the wavelength-division multiplexed optical transmission system according to the first embodiment of the present invention.

In the wavelength-division multiplexed optical transmission system according to the first embodiment of the present invention, the transmitting frame phases of the wavelength channels are different each other. As stated in the conventional technique, it is preferable to match the frame phase with a certain reference in the device for executing the signal process such as exchanging a plurality of signals. It is fully possible to match the frame phases of output signals from the device. If converting the output signal into an optical signal as it is, it is also dangerous to match the frame phases of optical signals which are wavelength-multiplexed and inputted to the optical fiber, as shown in FIG. 3A.

In order to differ the frame phases of the optical signals which are inputted to the optical fiber transmitting line each other, the frame phase may be deviated until it is transmitted to the optical fiber transmitting line. That is, according to the present embodiment, the frame phase updating units 11 to 13 in the inter-station transmitting device 1 deviate the frame phases of the optical signals transmitted to the optical fiber transmitting line, respectively.

The present embodiment adopts the method of presetting the difference between the transmitting frame phase and the reference frame phase so as to differ the transmitting frame phases, respectively. Except for the aforementioned method as a method of determining the phase quantity to be deviated, there are a method of selecting the frame phase at random and a method of providing a controller for monitoring and setting the transmitting frame phases and of setting the transmitting frame phases by the controller so that they are different.

The description turns to the method of selecting the frame phase at random. The random selection herein means to determine the frame phase within a range of one frame period at random. As a result, if providing a large number of the devices and inputting signals whose input frame phases are the same to the devices, the output frame phases ought to be disassembled.

Specifically speaking, it is sufficient to generate a random number whose range corresponds to 0 to one frame period and to set the output frame phase to the frame phase corresponding thereto. If selecting the frame phase at random, although the frame phase updating units especially need no frame phase as a reference, it is obvious that the frame phase as a reference may be obtained and a frame phase with a random phase difference corresponding to 0 to one frame period may be set to a frame phase for itself.

Figure 4:
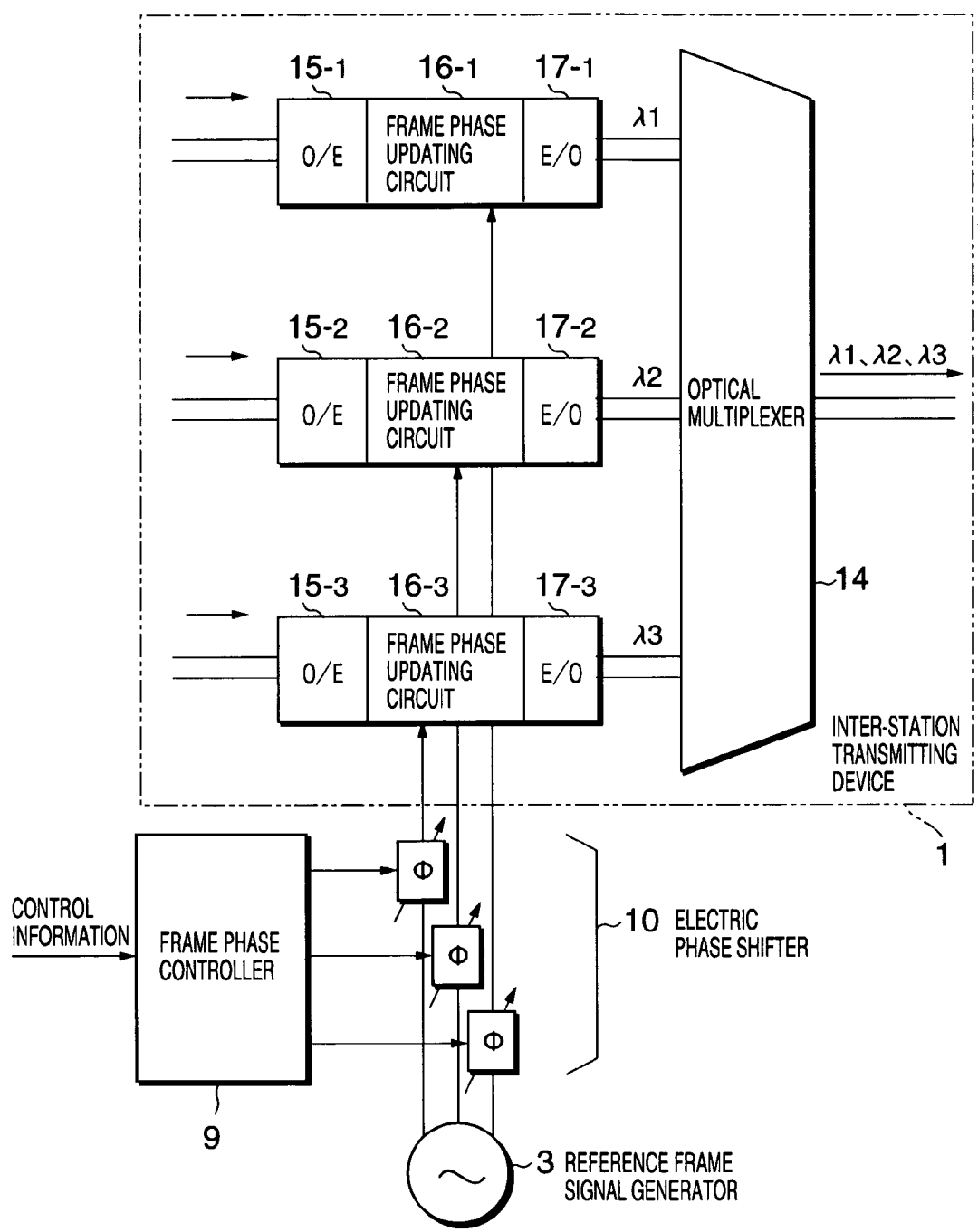
FIG. 4 is an illustrative diagram of a frame phase control method according to the first embodiment of the present invention.

FIG. 4 is a diagram for illustrating a frame phase control method according to the first embodiment of the present invention. Referring to FIG. 4, the present embodiment is one example wherein the present frame phase control method is applied to the device construction for updating the frame phases of the transmitting channels by use of frame phase updating circuits 16-1 to 16-3 in the inter-station transmitting device 1.

In other words, the inter-station transmitting device 1 comprises: O/Es (optical/electric signal converting circuits) 15-1 to 15-3; the frame phase updating circuits 16-1 to 16-3; E/Os 17-1 to 17-3; and an optical multiplexer 14, and has the reference frame signal generator 3, a frame phase controller 9, and an electric phase shifter 10.

The frame phase controller 9 receives management information such as the number of wavelength, wavelength separation between channels, and transmitting line dispersion value of the optical signals which are wavelength-multiplexed to the same fiber from a network management system or other system controlling device, calculates the disposition of the frame phases so that the frame phases are the most uncorrelative, and instructs the frame phase updating circuits 16-1 to 16-3 on the frame phases, respectively. For example, the frame phase for each wavelength channel is disposed with equal spacing that is determined by the number of wavelength to differentiate the shifting value. The spacing can be adjusted considering the dispersion value. According to the present embodiment, the electric phase shifter 10 shifts signals from the reference frame signal generator 3.

Incidentally, there is a case wherein it is impossible to update the frame phases of some signals among the wavelength-multiplexed signals. For example, in an optical wavelength add-drop multiplexer (ADM), the "through" channel should be passed through without any change. In such a case, the frame phase controller 9 also obtains control information whether or not the frame phase can be updated every wavelength channel as control information, so that the frame phase can be controlled so as to make the frame phase uncorrelative as much as possible only by use of updatable wavelength channel.

Moreover, it is able to set the frame phases so as not to overlap the frame phase of the wavelength channel capable of updating to the frame phase incapable of updating by having a system for splitting a part of optical signals of the wavelength channel incapable of updating, detecting the frame phase, and inputting the detected frame phase to the controller 9. The frame phase is detected by extracting only the frame frequency after O/E conversion. In particular, in case of the SONET/SDH signal, it is possible to detect the frame phase with simple and inexpensive construction because the frame frequency is a low frequency of 8 kHz.

Although the method of selecting the phase at random can be implemented most easily, it is made necessary to examine whether or not the possibility for accidental phase matching causes a problem on operation. When using the method of presetting the phase difference between one frame phase and the reference frame phase, the realization is easy and the effect is certain and, however, there is a possibility that the phase delay quantities of all transmitters have to be reset in case of providing a new wavelength channel. The method of using the controller for monitoring the frame phase has a certain effect and high flexibility.

Referring to the embodiments, when needing the reference frame phase (reference frame phase generator 3), it is also able to utilize the frame signal of the signal inputted to the frame phase updating units extracted according to the above-stated method, in place of the use of the reference frame phase.

Figure 5:
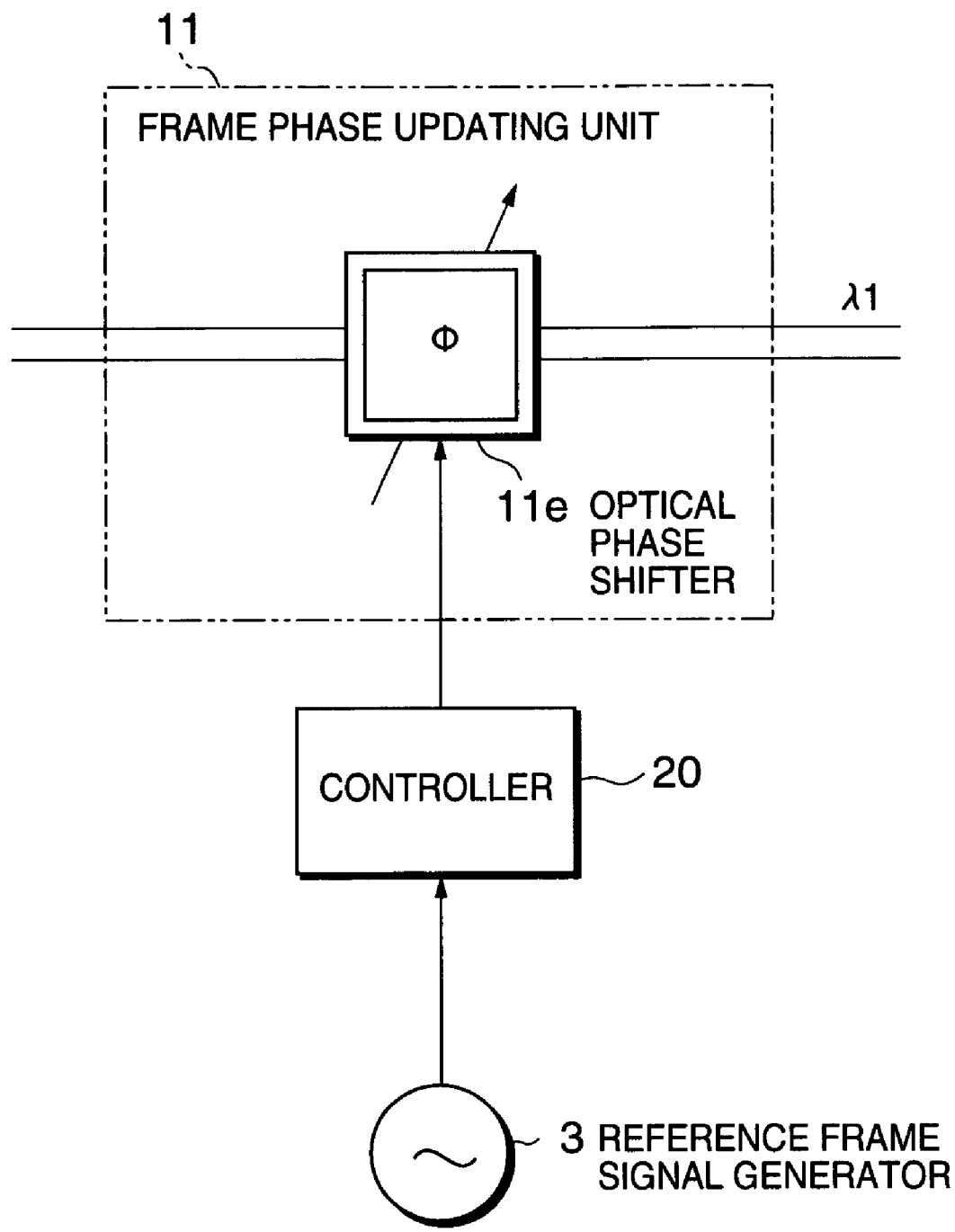
FIG. 5 is a block diagram showing another constructional example of the frame phase updating circuit in FIG. 1.

FIG. 5 is a block diagram illustrating another constructional example of the frame phase updating unit 11 in FIG. 1. Referring to FIG. 5, the frame phase updating unit 11 comprises an optical phase shifter 11e. According to a method shown in FIG. 5, the optical phase shifter 11e delays the inputted optical signal by a preset quantity on the basis of the control operation by the controller 20. The controller 20 controls the optical phase shifter 11e, based on the reference frame phase from the reference frame phase generator 3.

Figure 18A:
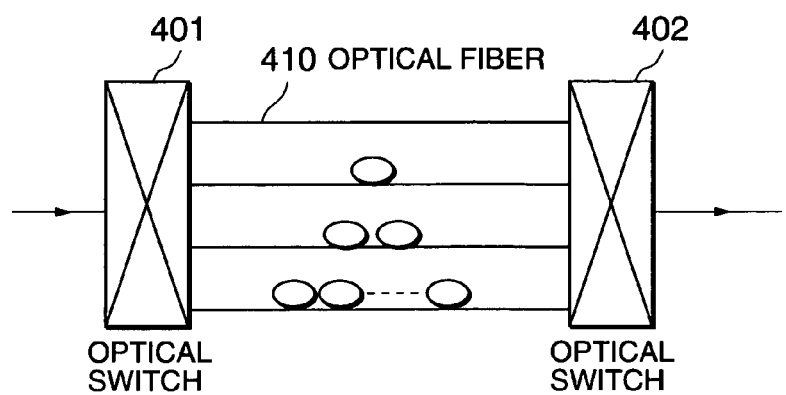
FIG. 18A is an illustrative diagram showing a construction of an optical phase shifter using an optical delay lines as an example.

As the optical phase shifter 11e, an optical variable delay line, etc. are considered. FIG. 18A is an illustrative diagram showing a construction of an optical phase shifter using an optical delay lines and switch as an example.

Referring to FIG. 18A, inputted light is selectively switched by an optical switch 401 to one of the optical fibers 410 having different optical delay with each other, and gathered to the one output optical fiber by optical switch 402.

Figure 18B:
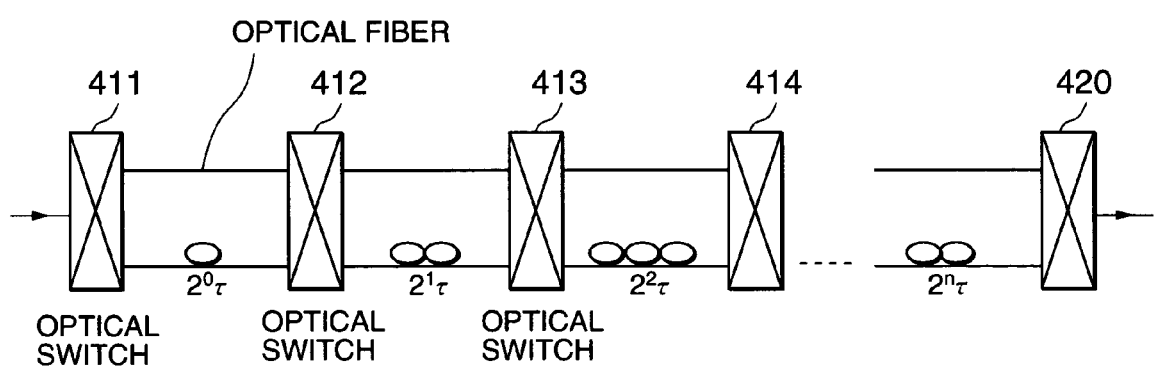
FIG. 18B is an illustrative diagram showing a construction of an optical phase shifter using optical delay lines and switch as another example.

FIG. 18B is an illustrative diagram showing a construction of an optical phase shifter using optical delay lines and switch as another example. Referring to FIG. 18B, the optical phase shifter is constructed with plural optical switch and inputted light is switched to pass an optical fiber with certain optical delay, and by that optical switch ' switching, the optical delay are varied.

A frame period of the SONET/SDH signal is equal to 25 μs, namely, extremely long and one wavelength of 8 kHz frame period, has a length equivalent to an inter-station distance of about 25 km in the optical fiber transmitting line. Therefore, it is impossible in physical view to vary the shifting quantity by utilizing the variable delay line and however, this is valid for a short frame period. Then, obviously, the optical phase shifter 11e may be used individually and also together with the electric phase shifter 11d.

Figure 6:
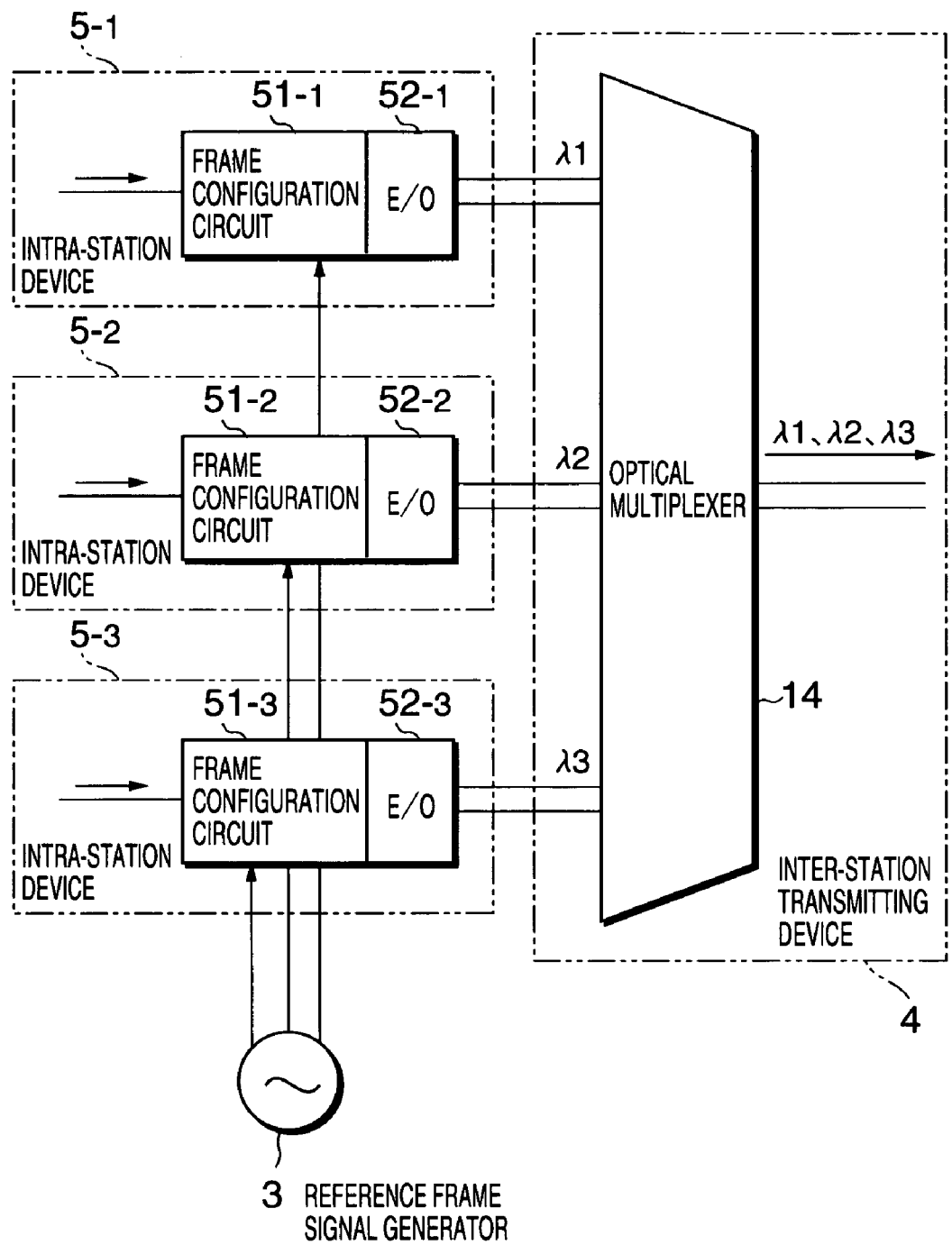
FIG. 6 is a block diagram showing a construction on a transmitting side in a wavelength-division multiplexed optical transmission system according to a second embodiment of the present invention.

FIG. 6 is a block diagram showing a construction on a transmitting side in a wavelength-division multiplexed optical transmission system according to a second embodiment of the present invention. Referring to FIG. 6, according to the second embodiment of the present invention, the transmitting side in the wavelength-division multiplexed optical transmission system comprises an inter-station transmitting device 4 and intra-station devices 5-1 to 5-3. It is noted to schematically illustrate a portion, to which the optical signals outputted from the intra-station devices 5-1 to 5-3 are wavelength-multiplexed and transmitted to the optical fiber transmitting line which inter-connects, only by three channels in FIG. 6.

The inter-station transmitting device 4 comprises an optical multiplexer 14. The intra-station devices 5-1 to 5-3 comprise: frame configuration circuits 51-1 to 51-3; and E/Os 52-1 to 52-3, respectively.

According to the second embodiment of the present invention, the frame configuration circuits 51-1 to 51-3 in the intra-station devices 5-1 to 5-3 are provided with functions equivalent to the frame phase updating units 11 to 13 provided in the inter-station transmitting device 1 according to the first embodiment of the present invention. That is, according to the foregoing method, output signals from the intra-station devices 5-1 to 5-3 are controlled so as to differ the frame phases, respectively, upon multiplexing the output signal by the optical multiplexer 14. In this case, constructions shown in FIGS. 2 and 5 can be used as frame phase updating units in the frame configuration circuits 51-1 to 51-3 and, therefore, the description for the constructions and operation is omitted.

Figure 7:
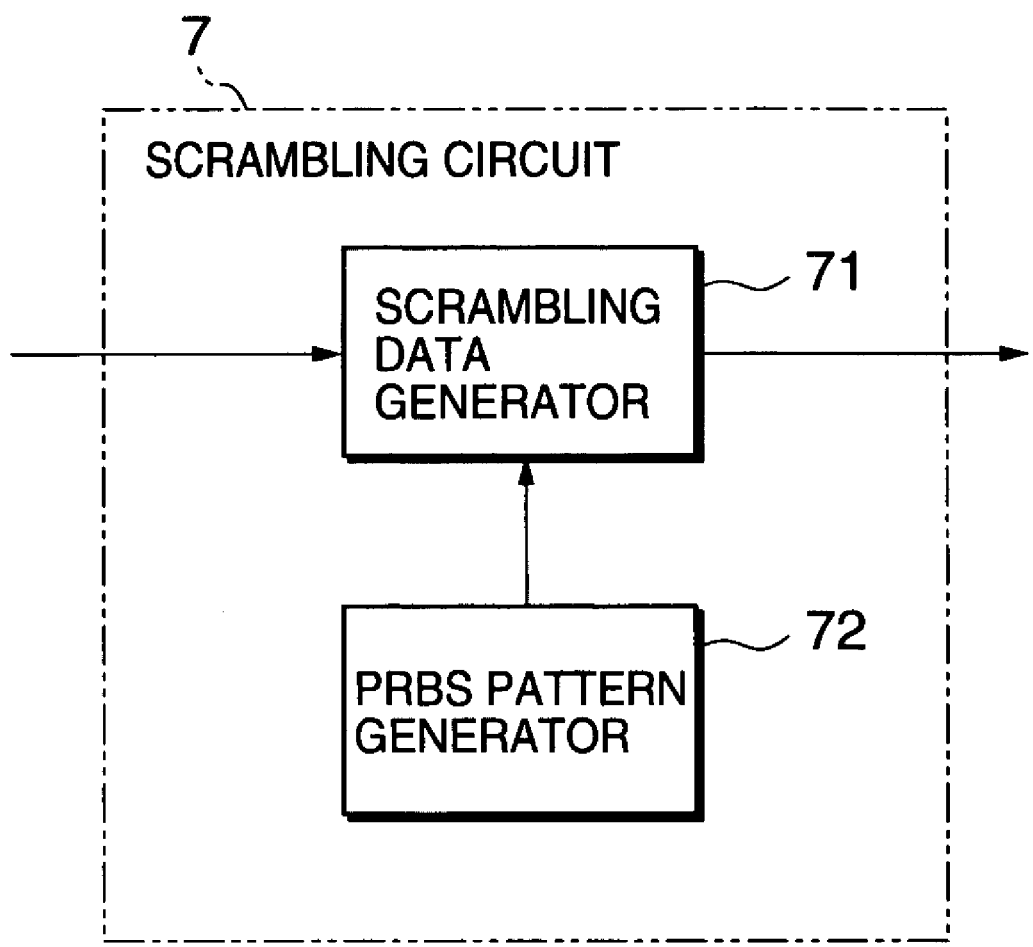
FIG. 7 is a block diagram showing a construction of an intra-station device on a transmitting side in a wavelength-division multiplexed optical transmission system according to a third embodiment of the present invention.

FIG. 7 is a block diagram illustrating a construction of a scrambling circuit used for a wavelength-division multiplexed optical transmission system according to a third embodiment of the present invention. Referring to FIG. 7, a scrambling circuit 7 according to the third embodiment of the present invention comprises a scrambling data generating unit 71 and a PRBS (Pseudo Random Bit Sequence: pseudo random) pattern generator 72. This scrambling circuit is located in the intra-station device.

Based on a PRBS pattern generated by the PRBS pattern generator 72, the scrambling data generator unit 71 scrambles data in the intra-station device 7. Incidentally, the PRBS pattern generator 72 generates a scrambling pattern different from that in another intra-station device (not shown), namely, a pattern peculiar to the intra-station device.

Figures 16, 17:
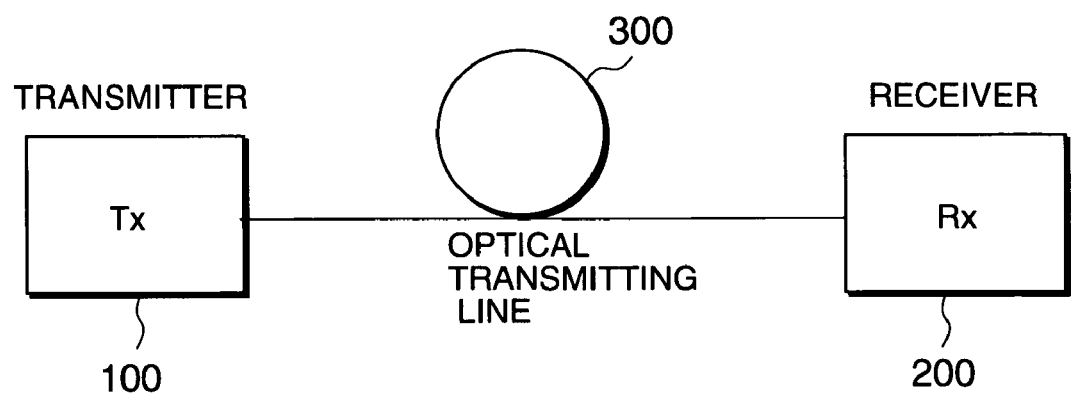
FIG. 16 is a table showing an M-sequence in a generating polynomial with seven delay elements.
FIG. 17 is an illustrative diagram showing a construction of an optical transmission system according to the present invention.

Herein, one of a so-called M-sequence code is a pseudo random pattern which is generated from a generation polynomial $(1+X^6+X^7)$ that is specified upon the SONET/SDH standard. FIG. 16 shows the M-sequence having eighteen kinds which is obtained by seven delay elements, similarly to the foregoing M-sequence code.

The M-sequence in detail, and [7.6] in FIG. 16 indicates $(1+X^6+X^7)$. Sequence A and B in FIG. 16 indicate patterns whose generating order (time) is reverse.

Referring to FIG. 7 and FIG. 16, the description turns to a method of avoiding matching scrambling patterns according to the third embodiment of the present invention. According to the third embodiment of the present invention, data scrambling patterns are made different each other by depending on the wavelength channels.

Generally, the data transmitted through the wavelength channels in the wavelength-division multiplexed optical transmission system is uncorrelative. Therefore, if the scrambling patterns are the same, data after scrambling is normally uncorrelative. However, it is not guaranteed that it is uncorrelative and an exceptional accident might occur. Specifically speaking, there is a possibility that a remarkable strong correlation arises if transmitting the same data by way of a plurality of wavelength channels.

Then, in order to make the transmitting patterns uncorrelative each other if inputting the same data to a plurality of devices, a method of differing the scrambling patterns, respectively, is adopted. In other words, according to the present embodiment, the pattern generated by the PRBS pattern generator 72 is different from that of the scrambling circuit in another intra-station device.

Many kinds of scrambling patterns are obtained easily, as shown in FIG. 16. It is also sufficient to add a pattern set which is obtained by reversing "1" and "0" of the patterns, as the pattern variation. It is further sufficient to add an M-sequence code using the number of delay elements, which is except for seven. A random sequence excluding the M-sequence may be used.

Figure 13:
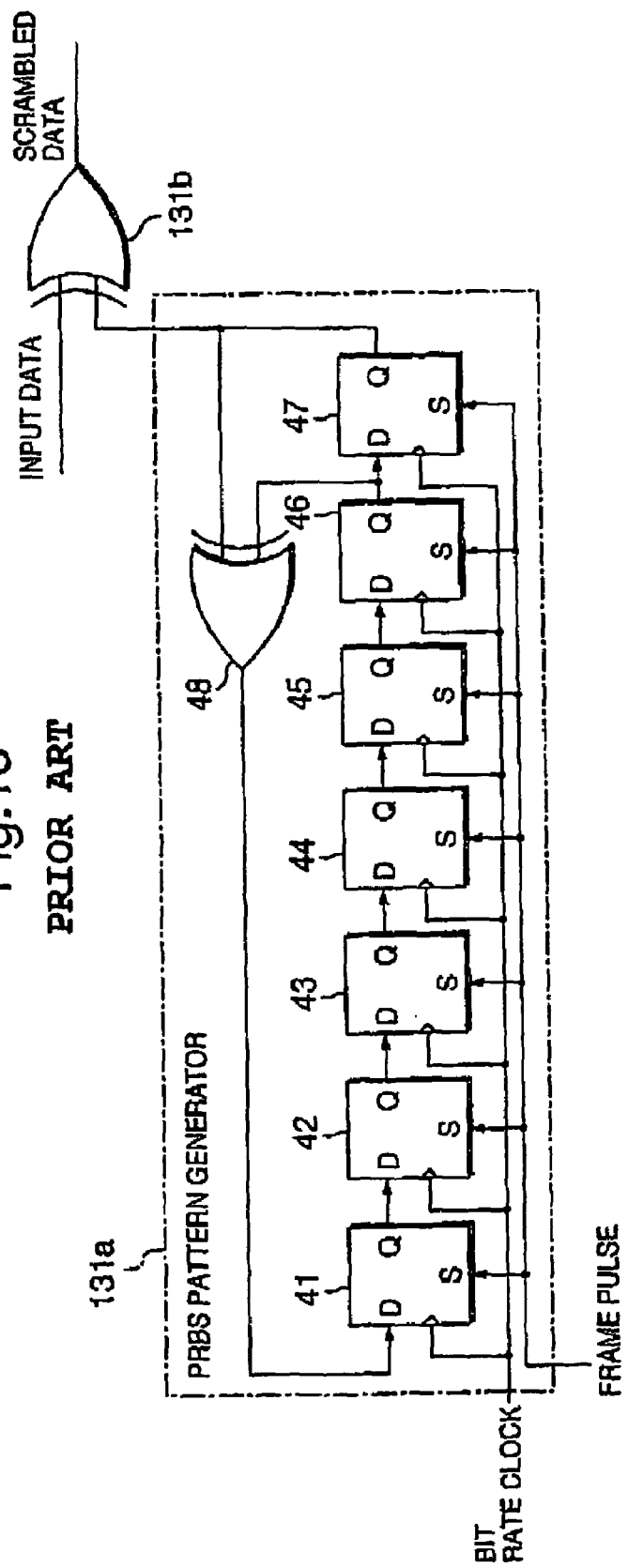
FIG. 13 is a diagram for illustrating an operation for generating a conventional scrambling pattern.
Figure 14:
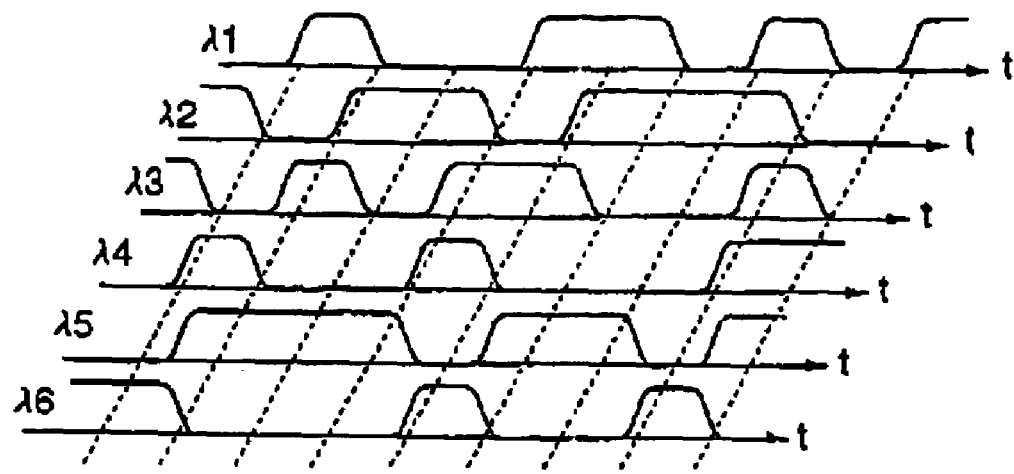
FIG. 14 is a diagram for illustrating the correlation of conventional data patterns between wavelength channels.
Figure 15:
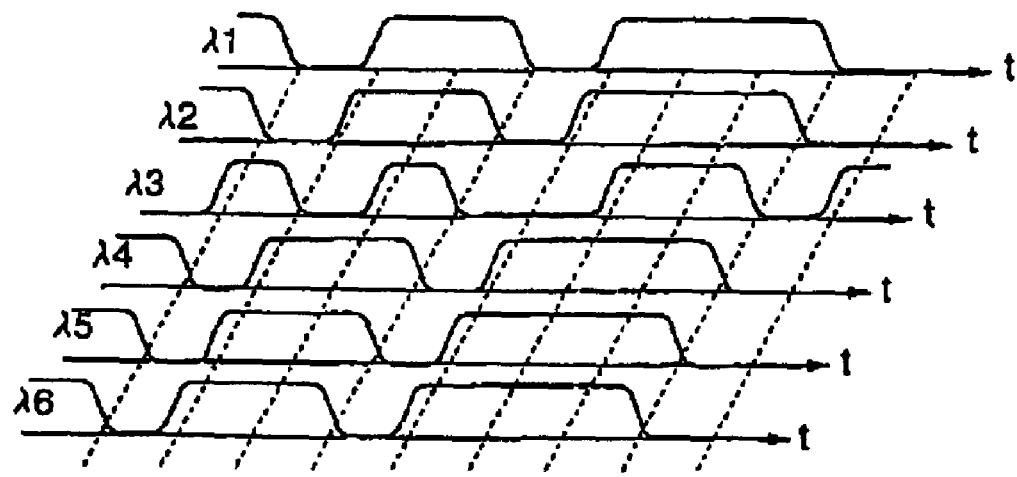
FIG. 15 is a diagram for illustrating the correlation of conventional data patterns among wavelength channels.

The above-discussed patterns also can be stored into a nonvolatile memory (ROM) and read out sequentially, in addition to generating the patterns by the shift register as shown in FIG. 13. The patterns can be selected by the scrambling circuit 7 and a scrambling circuit in another device, thereby making it possible to differ the scrambling patterns between the wavelength channels, respectively.

Then, to obtain sufficient transmission quality, it is preferable that the random sequence used for scrambling has no deviation in the numbers of "0" and "1" and the sequence of the same symbols is suppressed. Preferably, the period is substantially equal to 2160 bits (=270 bytes) as a payload length or to a fraction of an integer. Two hundred and seventy bytes is a fundamental unit of the SONET/SDH data payload portion.

If matching a period obtained by multiplying a scrambling pattern period by an integer number with the period, the number of the scrambling patterns used herein is always equal to an integer number. Therefore, the deviation hardly occurs in the numbers of "1" and "0". However, there is exemplified a device for estimation on the assumption that the scrambling pattern period is equal to 127 bits and it is thus preferable not to change the period of 127 bits.

According to the third embodiment of the present invention, if changing the scrambling pattern, only execute the scrambling process by employing the scrambling data generating unit 71 in the scrambling circuit 7.

Accordingly, in proportion to the definite function, it is able to simplify the signal processing circuit and reduce costs. When configuring the frame for error correcting code herein, the third embodiment of the present invention can be embodied by adding the frame configuration to the processing circuit, and also can suppress the increase in the number of parts. The scrambling circuit 7 can be used for the inter-station transmitting device 1, etc., as shown in FIG. 1.

In order to descramble the data on a receiving side (not shown), the scrambling pattern used on the transmitting side must be known. Mainly, there are two methods of communicating the scrambling pattern. According to one communicating method, by embedding information indicative of a pattern kind of non-scrambled portion in the data signals thereto, the information is communicated to a receiver. According to the other communicating method, by transmitting the information via a control system different from a main signal system, the information is communicated to the receiver. In case of the former, the information is communicated by the portion where the data signal is not scrambled and therefore it is necessary to pay attention to prevent the bit pattern from becoming the sequence of the same symbols which may get arise a remarkable strong correlation.

In order to make the channels uncorrelative, a system is necessitated, whereby the scrambling patterns are different each other among the wavelength channels. As for the realizing methods, there are a first method of decreasing the possibility that the scrambling patterns are matched if providing a fully large number of scrambling patterns and selecting the scrambling pattern at random, a second method of presetting the scrambling patterns which are different each other, and a third method of researching the scrambling pattern kind which is used by another transmitter by way of a control line and selecting the scrambling pattern different from the researched type. According to the second and third methods, it is capable of certainly preventing the scrambling patterns from being matched if there is not so many types of the prepared scrambling patterns.

The description turns to a method of selecting the scrambling pattern at random. One scrambling pattern is determined at random from among selectable scrambling patterns, and to thereby select the scrambling pattern at random. As a consequence, if providing a large number of the devices, the selected scrambling patterns ought to be disassembled. Specifically speaking, a range of generated random numbers corresponds to the number of selectable scrambling patterns and the scrambling pattern corresponding thereto may be set.

Figure 8:
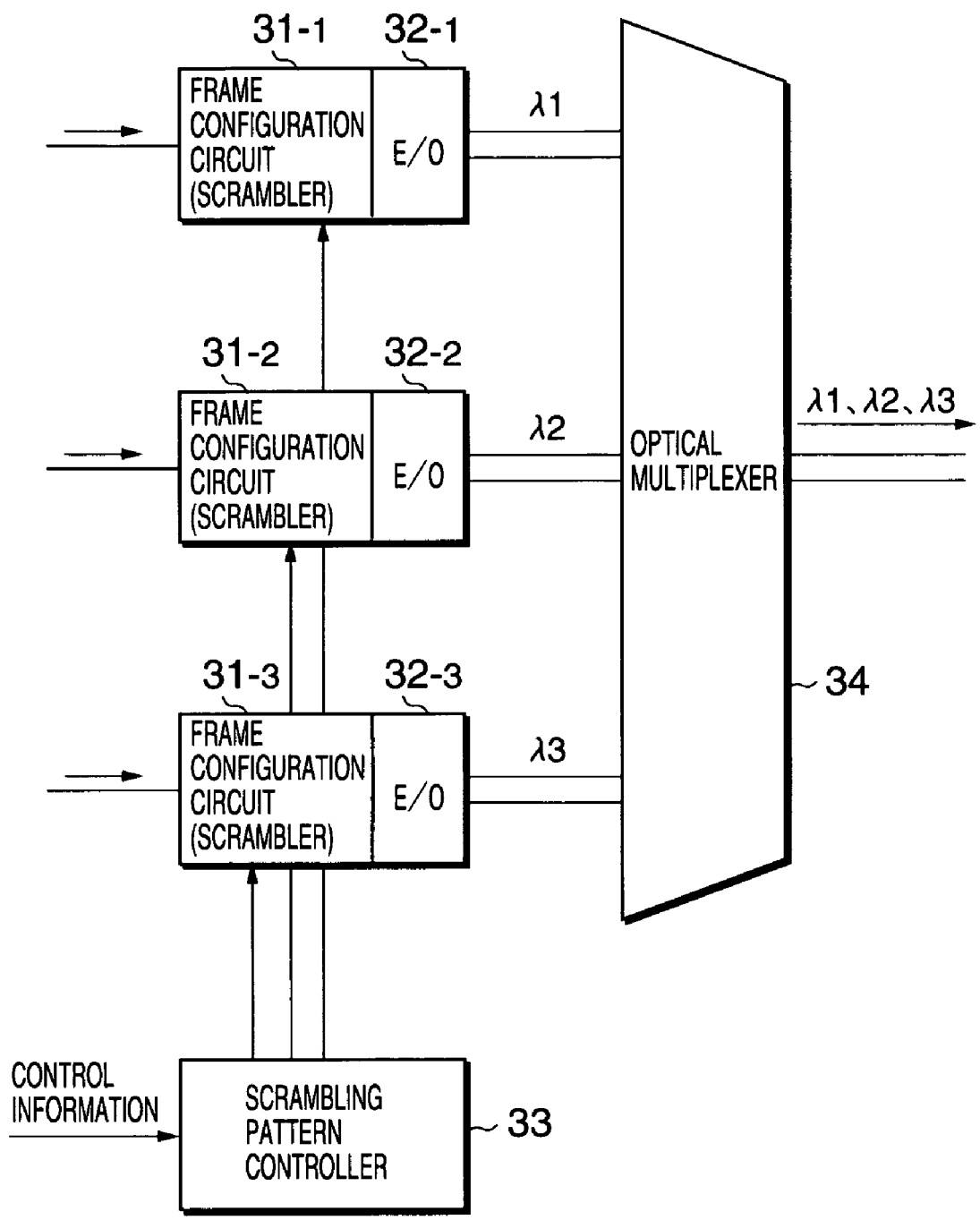
FIG. 8 is an illustrative diagram of a scrambling pattern control method according to the third embodiment of the present invention.

FIG. 8 is a diagram illustrating a scrambling pattern control method according to the third embodiment of the present invention. Referring to FIG. 8, the present embodiment is one example obtained by applying the present scrambling pattern control method to scramblers included in frame configuration circuits 31-1 to 31-3 of a transmitter for transmitting optical signals which are wavelength-multiplexed to the same fiber.

That is, the present embodiment comprises: the frame configuration circuits (scramblers) 31-1 to 31-3; E/Os 32-1 to 32-3; a scrambling pattern controller 33; and an optical multiplexer 34.

The scrambling pattern controller 33 receives managing information such as the number of wavelength, wavelength separation between channels, transmitting line dispersion value of the optical signal which is wavelength-multiplexed to the same fiber, calculates the scrambling pattern allocation so that the scrambling patterns are the most uncorrelative, and instructs the scramblers (frame configuration circuits 31-1 to 31-3) on the kind of scrambling pattern.

In some cases, that the scrambling patterns of some signals among the wavelength-multiplexed signals cannot by updated as mentioned above. In such a case, the scrambling pattern controller 33 obtains information whether or not the scrambling pattern can be updated every wavelength channel as control information, so that the scrambling patterns can be controlled so as to make the scrambling patterns uncorrelative as much as possible only by use of updatable wavelength channel.

Further, the controller 9 obtains scrambling pattern information of the wavelength channel incapable of updating, and can set it to make the scrambling pattern of the updatable wavelength channel unequal to the scrambling pattern incapable of updating. Since the information about the kind of scrambling pattern is transmitted from the transmitter to the receiver through any path, the controller 9 can obtain the individual control information.

Figure 9:
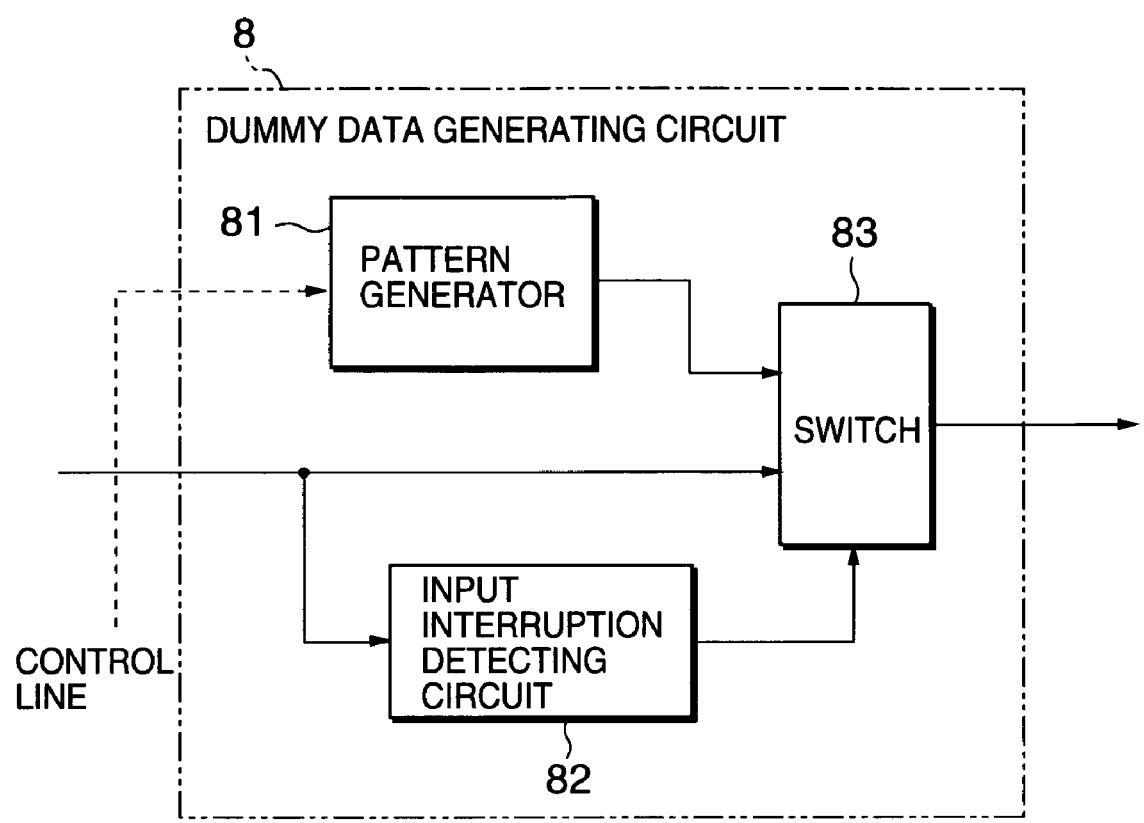
FIG. 9 is a block diagram showing a construction of an intra-station device on a transmitting side in a wavelength-division multiplexed optical transmission system according to a fourth embodiment of the present invention.

FIG. 9 is a block diagram illustrating a construction of a dummy data generating circuit used for a wavelength-division multiplexed optical transmission system according to a fourth embodiment of the present invention. Referring to FIG. 9, according to the fourth embodiment of the present invention, a dummy data generating circuit 8 comprises: a pattern generator 81; an input interruption detecting circuit 82; and a switch 83.

The pattern generator 81 in the dummy data generating circuit 8 is a circuit for generating dummy data, and generates dummy data generated by a dummy data generating circuit in another device (not shown), namely, patterns peculiar to the dummy data generating circuit.

The input interruption detecting circuit 82 detects the interruption for input data (dummy data) from a circuit (not shown) in the dummy data generating circuit 8. If detecting the interruption for input data, the input interruption detecting circuit 82 outputs an instruction for switching the switch 83 so as to select the dummy data from the pattern generator 81.

The switch 83 selects and outputs one of the input data from an external circuit of the dummy data generating circuit 8 and the dummy data from the pattern generator 81 in accordance with a switching instruction from the input interruption detecting circuit 82.

Referring to FIG. 9, the description turns to a method of avoiding matching the dummy data patterns according to the fourth embodiment of the present invention. According to the fourth embodiment of the present invention, when meaningless data (dummy data) must be stored to the data payload portion and transmitted, the dummy data pattern are made different each other by depending on the wavelength channel.

As explained above, there is a fear that the dummy data is input to the data payload portion and transmitted, as a special case. If the same or analogous dummy data is inserted to each payload of all the wavelength-multiplexed channels simultaneously, it is dangerous that the occurrence of the strong correlation results in various problems.

Then, if the input interruption detecting circuit 82 detects that the transmitting data is dummy data, the patterns are prevented from matching by changing the dummy data pattern every wavelength channel. That is, the dummy data patterns generated by the pattern generator 81 are made different by depending on the intra-station devices.

In this case, the pattern generated by the pattern generator 81 is invalid data (dummy data) and it is also possible to discriminate that the data is invalid on the receiving side, for example by monitoring the overhead of the received signal Therefore, it is unnecessary not only to extract the data on the receiving side, but also to communicate the kind of dummy data to the receiving side.

However, it is necessary to pay attention to the correlativity between the dummy data pattern and the pattern which is used for the scrambler because the dummy data pattern is normally scrambled. As an extreme example, if utilizing a pattern similar to the scrambling pattern, this is just an operation for the self-correlation and therefore it is fear that the sequence of the same symbols causes remarkably.

According to the fourth embodiment of the present invention, the switch 83 in the dummy data generating circuit 8 is utilized and only the data payload portion of the frame may be subjected to the process to change the dummy data pattern. Thus, it is able to simplify the signal processing circuit and reduce costs, in proportion to the limitation for function. If configuring a frame for error correcting code herein, the fourth embodiment can be embodied by adding the frame configuration to the processing circuit, and it is also possible to suppress the increase in the number of parts.

In order to making the channels uncorrelative, there is necessitated a system for differing the dummy data patterns among the wavelength channels, in addition to the above-discussed system. As an implementing method thereof, there are a first method of extremely diminishing the possibility that the dummy data patterns are matched if preparing a fully many dummy data patterns and selecting the dummy data pattern at random, a second method of presetting the dummy data patterns which are different each other, and a third method of researching the kind of the dummy data pattern which another transmitter uses by way of a control line and selecting a pattern which is different from the researched pattern. According to the second and third methods, if there are not so many kinds of prepared dummy data patterns, the pattern matching can be prevented certainly.

The description turns to a method of selecting the dummy data pattern at random. One of selectable dummy data patterns is determined at random, and to thereby select the dummy data pattern at random. As a consequence, if providing a numerous number of the devices, the selected dummy data patterns ought to have no deviation. Specifically speaking, a range of generated random numbers corresponds to the number of the selectable dummy data patterns and the dummy data pattern may be set correspondingly thereto.

Figure 10:
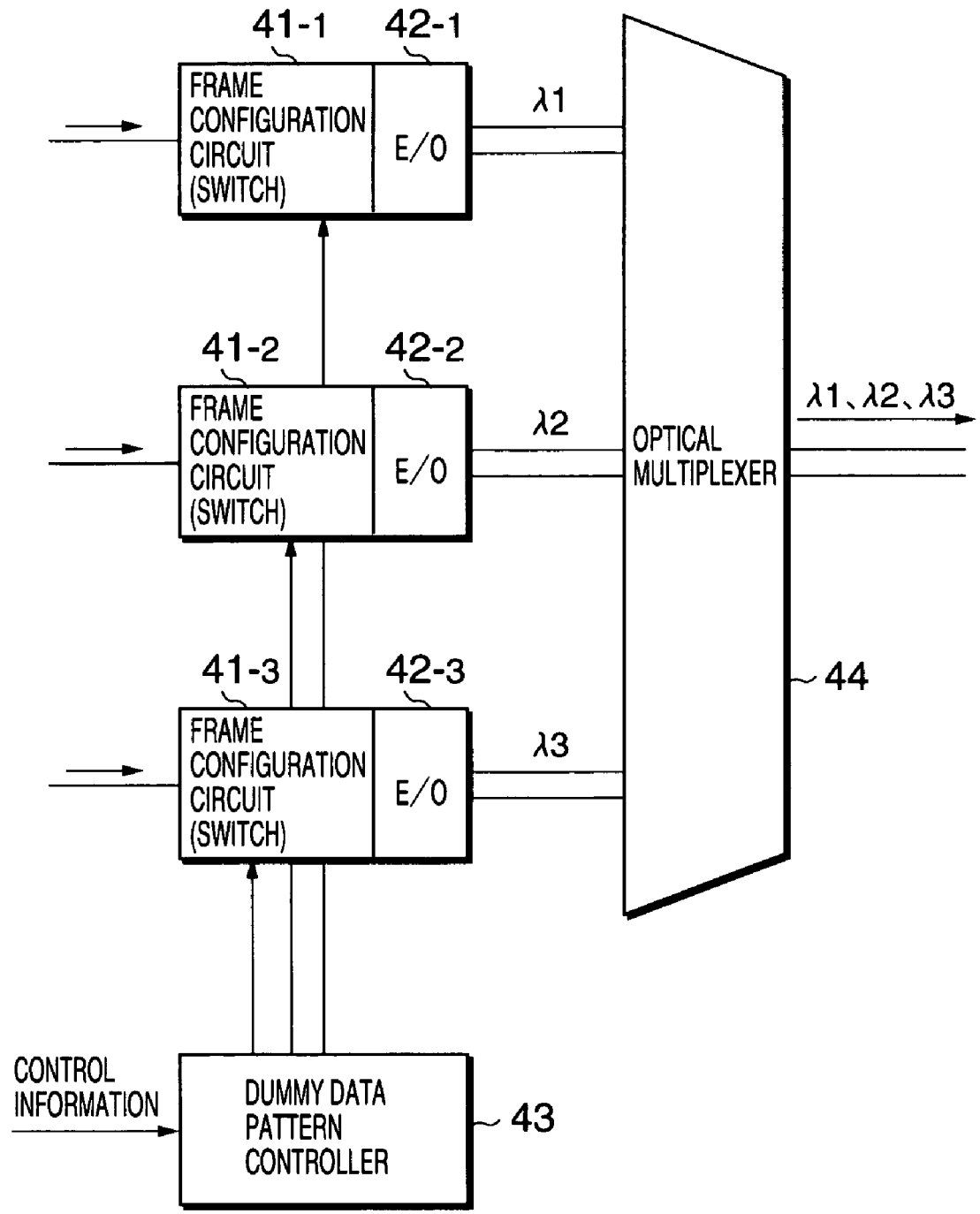
FIG. 10 is a diagram for illustrating a dummy data pattern control method according to the fourth embodiment of the present invention.
Figure 11:
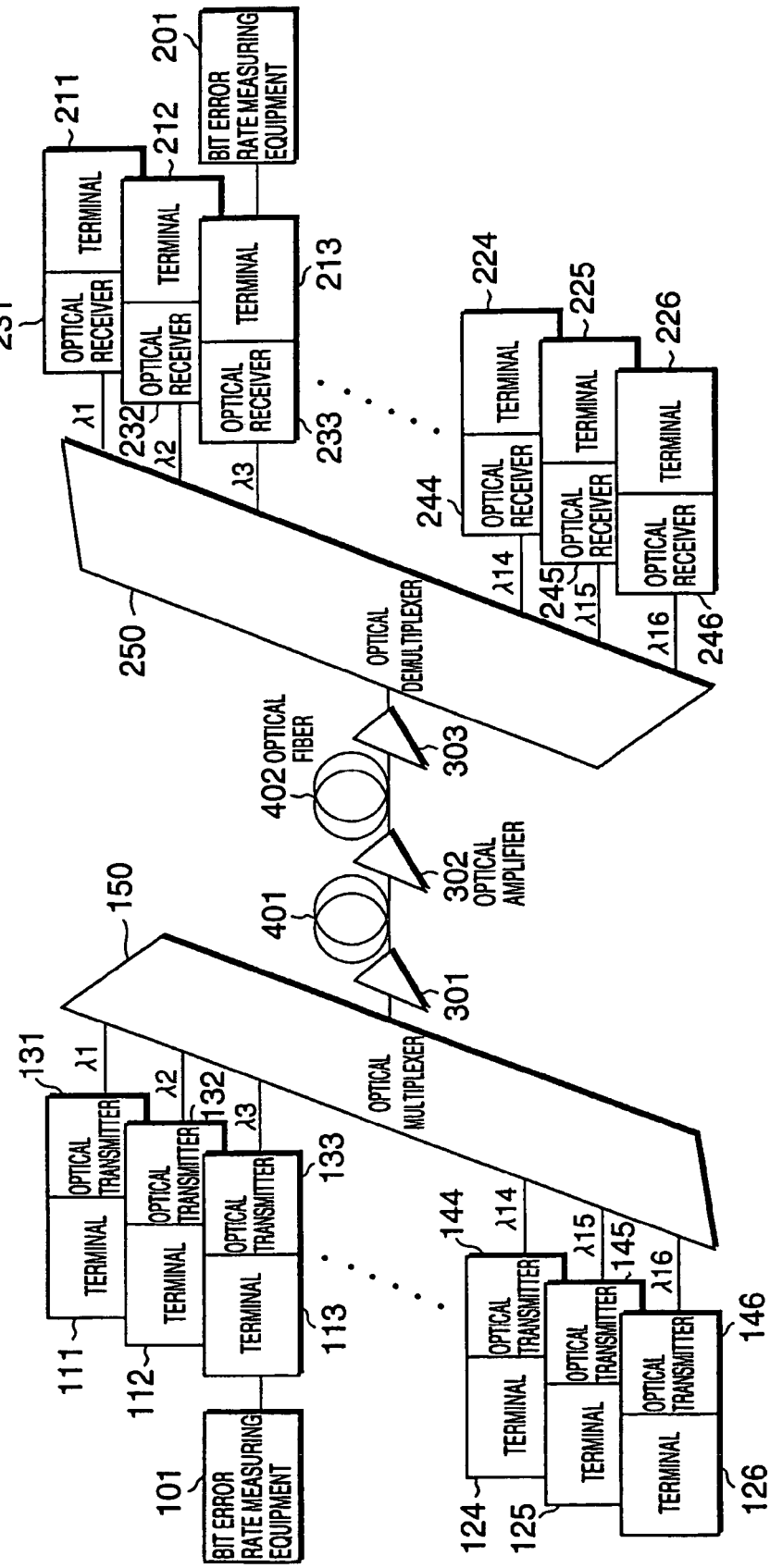
FIG. 11 is a block diagram showing a construction of a conventional wavelength-division multiplexed optical transmission system.
Figure 12:
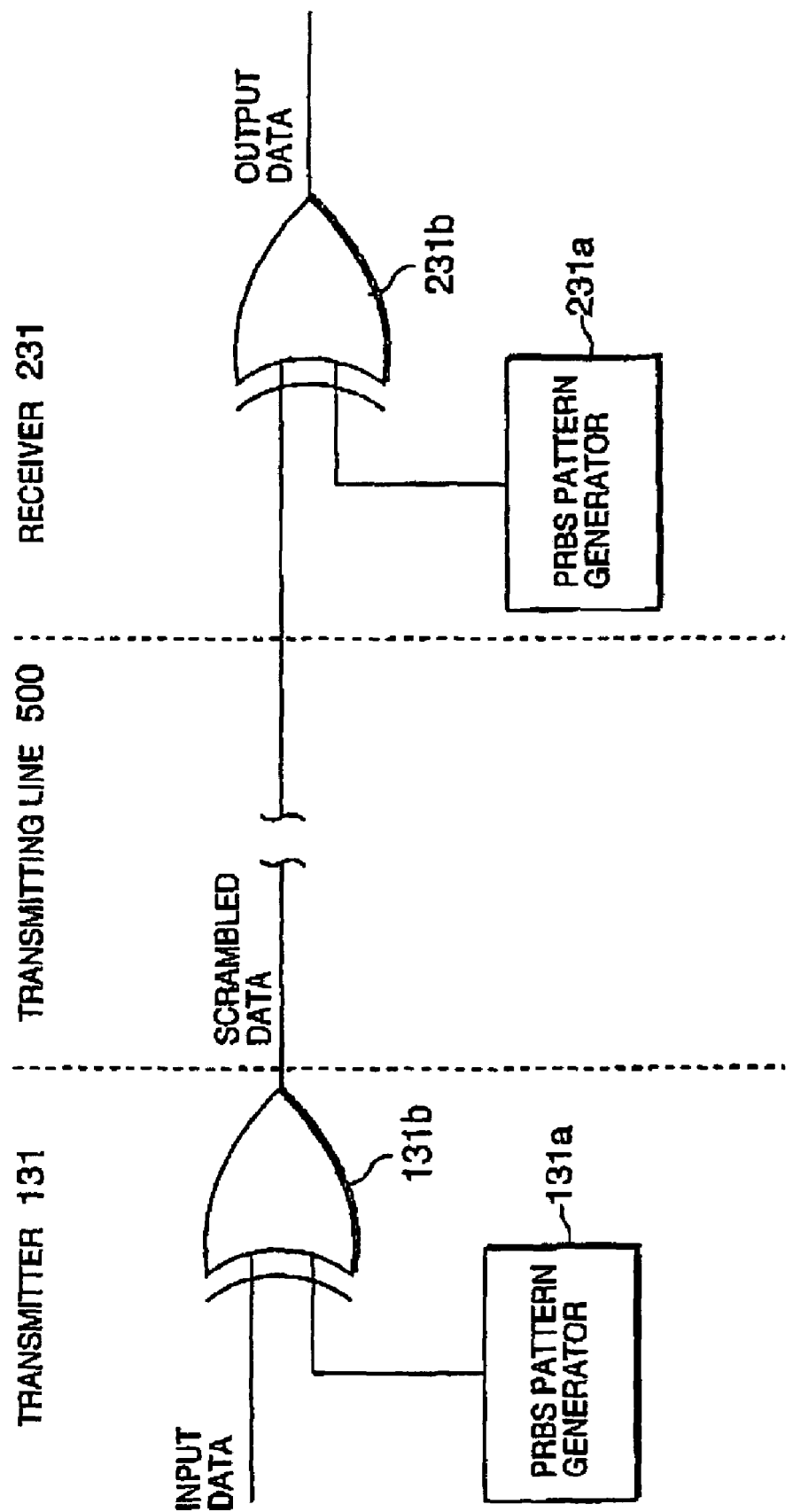
FIG. 12 is a diagram for illustrating a conventional scrambling operation.

FIG. 10 is a diagram for illustrating a dummy data pattern control method according to the fourth embodiment of the present invention. Referring to FIG. 10, the present embodiment is one example obtained by applying the present dummy data pattern control method to a switch for switching the dummy data pattern to the dummy data patterns included in frame configuration circuits 41-1 to 41-3 in a transmitter for transmitting optical signals which are wavelength-multiplexed to the same fiber.

That is, the present embodiment comprises: the frame configuration circuits (switches for switching data to the dummy data pattern) 41-1 to 41-3; E/Os 42-1 to 42-3; a dummy data pattern controller 43; and an optical multiplexer 44.

The dummy data pattern controller 43 receives managing information such as the number of wavelength, wavelength separation between channels, transmitting line dispersion value of the optical signal which is wavelength-multiplexed to the same fiber, calculates the dummy data pattern allocation so that the dummy data patterns are the most uncorrelative, and instructs the switches (frame configuration circuits 41-1 to 41-3) on the kind of dummy data pattern.

In some cases, that the dummy data pattern of some signals among the wavelength-multiplexed signals cannot be updated as described above. In such a case, the dummy data pattern controller 43 obtains information whether or not the dummy data pattern can be updated every wavelength channel as control information, so that the dummy data pattern can be controlled so as to make the dummy data patterns uncorrelative as much as possible only by use of updatable wavelength channel.

As expressed above, according to the first to fourth embodiments of the present invention, with respect to the three uncorrelating means, although it is advantageous to use single uncorrelating means among the three uncorrelating means, the advantage can be obtained more certainly by combining the three uncorrelating means and applying the present invention to the combined uncorrelating means.

To execute this invention using any combination of three above uncorrelating means, so called a frame phase shifting mean, a scrambling pattern changing mean and a dummy data changing mean, they are applied as following. A frame phase shifting mean is applied at first to the optical signal, then a dummy data changing mean is applied, and a scrambling pattern changing mean is applied finally in the transmitter.

Although according to the first to fourth embodiment of the present invention, the SONET/SDH standard is stated as an example, the present invention is not limited thereto and it is obvious to obtain the aforementioned advantage if employing frame synchronizing communication. In case of executing error correcting encoding/decoding, framing is also necessary. The present invention may be applied in case of this framing.

Although according to the embodiments, the scrambling and dummy data patterns are embedded in the case where both patterns are included in the frame configuration circuit, obviously, it is also advantageous for the present invention to implement the scrambling and descrambling processes and the process for switching the pattern to the dummy data pattern, excluding the signal process for configuring the frame.

The relative frame phase among the channels entering the optical fiber transmitting line includes delay due to propagation from the frame configuration device to the optical multiplexer 14, besides the frame phase of the frame configuration circuit. In the SONET/SDH system in which the frame period is equal to 125 μs, namely long, the propagation delay is small and ignorable. Therefore, properly, the first to fourth embodiments of the present invention are embodied by the addition to the conventional frame configuration circuit.

Among devices for communicating data via the SONET/SDH interface irrespective of the inter-frame and inner-frame, usually, a input signal frame is resolved and an output signal frame is configured, the scrambling and descrambling processes are also conducted, and a process for embedding the dummy data is further performed when there is no input data.

Under such a situation, in order to realize to uncorrelate the frame phases, scrambling patterns, and descrambling patterns among the signals which are wavelength-multiplexed to the optical fiber transmitting line, it is necessary to select one at random therefrom or to grasp which signal enters which optical fiber transmitting line and also manage it.

Incidentally, local chromatic dispersion which is used for the wavelength multiplex is chromatic dispersion which is not zero typically. Because if the chromatic dispersion approaches zero, it is apt to cause a non-linear mutual interference among the wavelength multiplexing channels which means four-wave mixing and the transmitting quality is degraded.

The chromatic dispersion is a phenomenon that the propagation speed is different by depending on a wavelength, so that this causes relative delay among the wavelength channels upon transmitting multiplexed wavelength. When two wavelength channels having a wavelength difference of $\Delta\lambda$ are transmitted in an optical fiber transmitting line having a chromatic dispersion value D and a distance L, a relative delay of ($\Delta\lambda \times D \times L$) is caused between the two wavelength channels. As mentioned above, as the wavelengths are farther, a speed difference is made large. Therefore, it is expected that wavelength channels which are fully far are made uncorrelative naturally by the relative delay which is accompanied to the propagation.

However, the actual frame period of the SONET/SDH signal is 125 µs, namely, long and, contrarily, the relative delay caused by the chromatic dispersion is extremely shorter as compared to the actual frame period. Therefore, the uncorrelativity can be hardly expected.

When transmitting a wavelength in an optical fiber transmitting line which has a dispersion D=18 ps/nm/km and a distance of 100 km, there is caused a relative delay of 18 ns between the channels which are far by 10 nm each other. This is only about 0.014% of the SONET/SDH frame period and there is little change in the frame phase difference.

However, the frame period will become remarkably short in future and have a wide band whose wavelength band is over 100 nm, and there is a possibility that a full relative delay quantity is obtained to uncorrelate the frame phases. In this case, the wavelength range in which the correlativity is held during transmission may be subjected to the process for uncorrelate the frame phases, scrambling patterns, or dummy data patterns, as described in the present embodiments. If matching frame phases of fully far wavelength channels, no trouble causes.

As explained above, at least one of the frame phases, scrambling patterns, and dummy data patterns is subjected to the uncorrelating process, thereby maintaining the correlativity of data patterns among the wavelength channels ($\lambda 1$ to $\lambda 3$) to the low level. As a result, it is possible to prevent the generation of the large XPM and XGM which are generated when the correlativity is strong and to ensure a stable transmitting quality.

Then, although signals inputted to the inter-station transmitting devices 1 and 4 are inputted from a plurality of intra-station devices 2-1 to 2-3 and 5-1 to 5-3, it is sufficient to use any signal inputted to the inter-station transmitting devices 1 and 4 and any input format. A plurality of ports may be provided for a single device and an optical signal from a remote station may become a transmitting signal of the local station without processing.

While this invention has been described in connection with certain preferred embodiment, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A wavelength-division multiplexed optical transmission system for transmitting an optical wavelength-division multiplexed signal using frames via an optical fiber transmitting line, comprising:
    a transmitter for converting an inputted electric signal into the optical wavelength-division multiplexed signal and transmitting the optical wavelength-division multiplexed signal;
    a receiver for receiving said transmitted optical wavelength-division multiplexed signal;
    a frame phase updating unit for mutually differing transmitting frame phases between at least two or more wavelength channels among a plurality of wavelength channels which are transmitted through a same optical fiber transmitting line;
    a frame configuration unit for configuring frames of said wavelength channels from a signal to be transmitted to said optical fiber transmitting line and selecting an output signal frame phrase itself at random; and
    a device for reducing mutual interference among a plurality of wavelength channel frames which are transmitted through said same optical fiber transmitting line,
    wherein said frame phase updating unit comprises:
        a phase shifter for shifting a phase by a phase delay quantity which is set on the basis of a reference frame phase that is inputted externally; and
        a frame phase updating circuit for setting the phase shifted by said phase shifter to an output signal frame phase itself, and wherein
        said phase shifter presets it to cause said phase delay quantity to mutually differ the transmitting frame phases of a wavelength channel group which is transmitted through said same optical fiber transmitting line.

2. A system according to claim 1, further comprising a controller for monitoring and setting the transmitting frame phases of the wavelength channels, wherein
    said controller sets the frame phase of a device for configuring the frames of said wavelength channels so as to mutually differ the transmitting frame phases among the wavelength channel group which is transmitted through said same optical fiber transmitting line.

3. A system according to claim 2, wherein said wavelength-division multiplexed optical transmission system sets a delay quantity of the transmitting frame phases of the wavelength channels corresponding to the control information.

* * * * *